United States Patent [19]
Bulloch, Jr.

[11] 3,942,926
[45] Mar. 9, 1976

[54] APPARATUS FOR FABRICATING FOAM PADS

[76] Inventor: Carl Gordon Bulloch, Jr., 31 Kingwood Place, Asheville, N.C. 28804

[22] Filed: June 12, 1974

[21] Appl. No.: 478,617

Related U.S. Application Data

[60] Continuation-in-part of Ser. No. 298,953, Oct. 19, 1972, Pat. No. 3,818,560, which is a division of Ser. No. 130,328, April 1, 1971, Pat. No. 3,719,963.

[52] U.S. Cl. ............... 425/126 R; 264/46.4; 264/48; 425/127; 425/134; 425/453; 425/817 R
[51] Int. Cl.² ........................................ B29D 27/04
[58] Field of Search .......... 264/45.5, 45.8, 46.2, 54, 264/48, 46.4; 425/4 R, 817 R, 4 C, 817 C, 447, 449, 453, 451, 404, 445, 446, 127, 120, 125, 129, 261, 134, 126 R; 5/351; 29/91.1

[56] References Cited
UNITED STATES PATENTS

| | | | |
|---|---|---|---|
| 1,451,229 | 4/1923 | Loudenslager | 425/127 X |
| 2,661,496 | 12/1953 | Lubenow | 425/446 X |
| 3,005,213 | 10/1961 | Brown et al. | 264/54 X |
| 3,080,613 | 3/1963 | Wall et al. | 264/54 |
| 3,204,016 | 8/1965 | Sanger et al. | 425/817 R X |
| 3,243,491 | 3/1966 | Bethe | 425/817 R X |
| 3,541,639 | 11/1970 | Enicks | 425/4 C |
| 3,841,811 | 10/1974 | Peille | 425/817 C X |

*Primary Examiner*—R. J. Shore
*Assistant Examiner*—Mark Rosenbaum
*Attorney, Agent, or Firm*—Parrott, Bell, Seltzer, Park & Gibson

[57] ABSTRACT

An apparatus for fabricating foam pads having a generally flat inner surface with a depending peripheral edge, the flat inner surface including a dense outer crust. A spring assembly is adapted to be disposed so that the terminal face portions thereof contact the outer crust and with the depending edge of the pad confiningly receiving the spring assembly to prevent lateral displacement therebetween. The apparatus includes an open top mold, and a mold insert which is adapted to be floatingly positioned on the upper surface of the foaming material to level the same while permitting the formation of a dense outer crust thereon. The depending foam edge may then be formed by adding additional foamable material along the periphery of the pad between the border of the mold and mold insert, or by suitably attaching a preformed foam strip therealong.

22 Claims, 22 Drawing Figures

APPARATUS FOR FABRICATING FOAM PADS

The present application is a continuation-in-part of pending application Ser. No. 298,953, filed Oct. 19, 1972, now U.S. Pat. No. 3,818,560, and which in turn is a division of application Ser. No. 130,328, filed Apr. 1, 1971 and now U.S. Pat. No. 3,719,963.

The present invention relates to an apparatus for fabricating foam pads for use in a spring cushion construction which comprises an outer foam pad and an underlying spring assembly.

Conventionally, seat cushions of the desired type are fabricated by mechanically attaching a preformed pad to an underlying spring assembly. In an attempt to prevent the springs from gradually cutting their way through the foam during use and thereby destroying the cushion, it is common to also place a fabric insulator between the springs and foam. The use of such an insulator is not altogether satisfactory, however, since it adds to the cost of the resulting product, and the relative movement between the foam and terminal portions of the spring assembly during use tends to break down the insulator, thereby permitting the spring assembly to enter and cut through the foam.

It has also been proposed to fabricate foam cushions by employing a foamable elastomeric material which is adapted to form a dense outer crust along the upper surface when foamed in an open top mold, and wherein the foam rises within the mold during the foaming process to embed the terminal portions of a spring assembly being held above the mold such that the crust serves to "lock" the springs in the foam, note for example the U.S. patents to Koenigsberg, No. Re. 24,914 and Brown et al, No. 3,005,213. However, such method results in the foam pad and spring assembly being initially interconnected, and it is often desirable to separately fabricate the foam cushion and subsequently interconnect the spring assembly to reduce shipping and handling costs. Also, this latter practice has not heretofore been feasible when the pad is formed in an open top mold since the upper surface which includes the dense upper crust tends to become somewhat rounded or crowned. This characteristic is particularly pronounced when a relatively large pad such as would be used in a mattress is fabricated, and the existence of the crowned surface effectively precludes the subsequent positioning of a spring assembly against the upper surface since the pad would not lie flat on the spring assembly and the central portion of the pad would be of greater thickness than the peripheral portions.

It is accordingly an object of the present invention to provide an apparatus for fabricating foam pads which do not require a conventional insulator.

It is another object of the present invention to provide an apparatus for fabricating foam pads for use in spring cushion constructions and wherein the pads have a generally flat outer surface including a dense outer crust capable of preventing penetration by an adjacent spring assembly during prolonged use.

It is another object of the present invention to provide an apparatus for fabricating foam pads which have a peripheral depending edge portion which is adapted to confiningly receive a spring assembly within the bounds thereof to facilitate interconnection of the foam pad and spring assembly, and prevent lateral shifting therebetween.

It is still another object of the present invention to provide an apparatus for forming a foam pad which includes an open top mold for foaming a foamable material, and means for leveling a major portion of the upper surface during the foaming operation to thereby provide a relatively flat area for contacting an adjacent spring assembly.

It is a further object of the present invention to provide an apparatus for forming a foam pad in an open top mold and wherein the upper surface may be leveled during the foaming operation without significantly interfering with the formation of a dense upper crust.

It is also an object of the present invention to provide an apparatus for forming a foam pad having a raised edge along the periphery of the upper surface which is adapted to confiningly receive an adjacent spring assembly.

These and other objects and advantages of the present invention are achieved in the embodiments of the present invention illustrated herein by the provision of an apparatus for forming foamed pads which have a generally flat inner surface and a depending peripheral edge. (The edge is generally referred to herein as "raised" when described in association with the method of fabricating the pad, and as "depending" when described in association with the product since the pad is typically viewed as being inverted when assembled to the spring assembly). Such pads are fabricated by an apparatus which includes an open top mold adapted to receive a foamable elastomeric material therein to form a resilient pad having a dense upper crust on the upper surface thereof. A mold insert is provided which is adapted to be positioned on the upper surface of the foaming material. The mold insert is of an openwork construction and includes an upstanding peripheral flange, and is adapted to level the upper surface of the foaming material while serving to maintain a substantial portion thereof in contact with the air to thereby result in the formation of the dense upper crust. A raised foam edge may then be formed by depositing additional foamable material in a channel formed between the edge wall of the mold and the peripheral flange of the mold insert. The apparatus may further include infrared lamps for heating the surface of the foaming material prior to the placement of the mold insert thereon to increase the normal thickness of the crust.

Some of the objects of the invention having been stated, other objects will appear as the description proceeds, when taken in connection with the accompanying drawings, in which.

Figure 1:
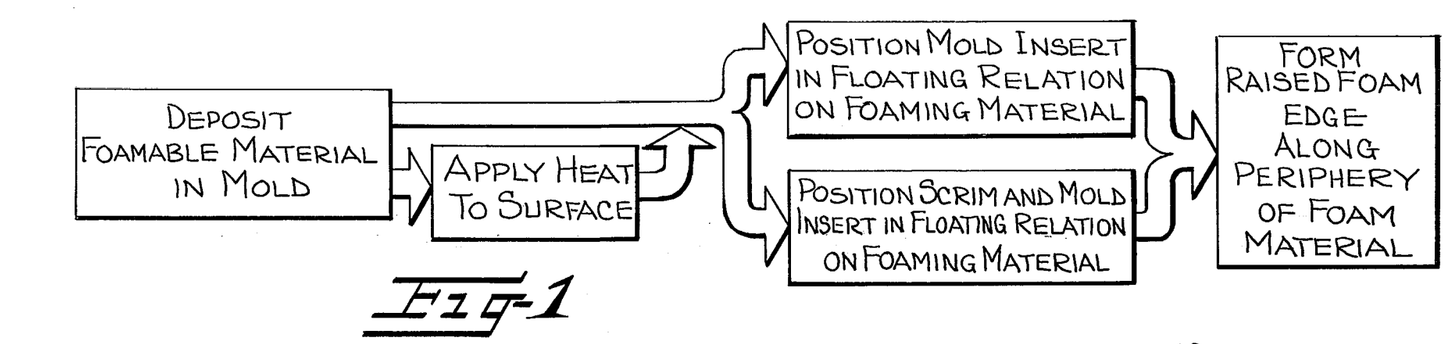
FIG. 1 is a flow chart illustrating the steps in making a foam pad in accordance with the present invention.
Figure 2:
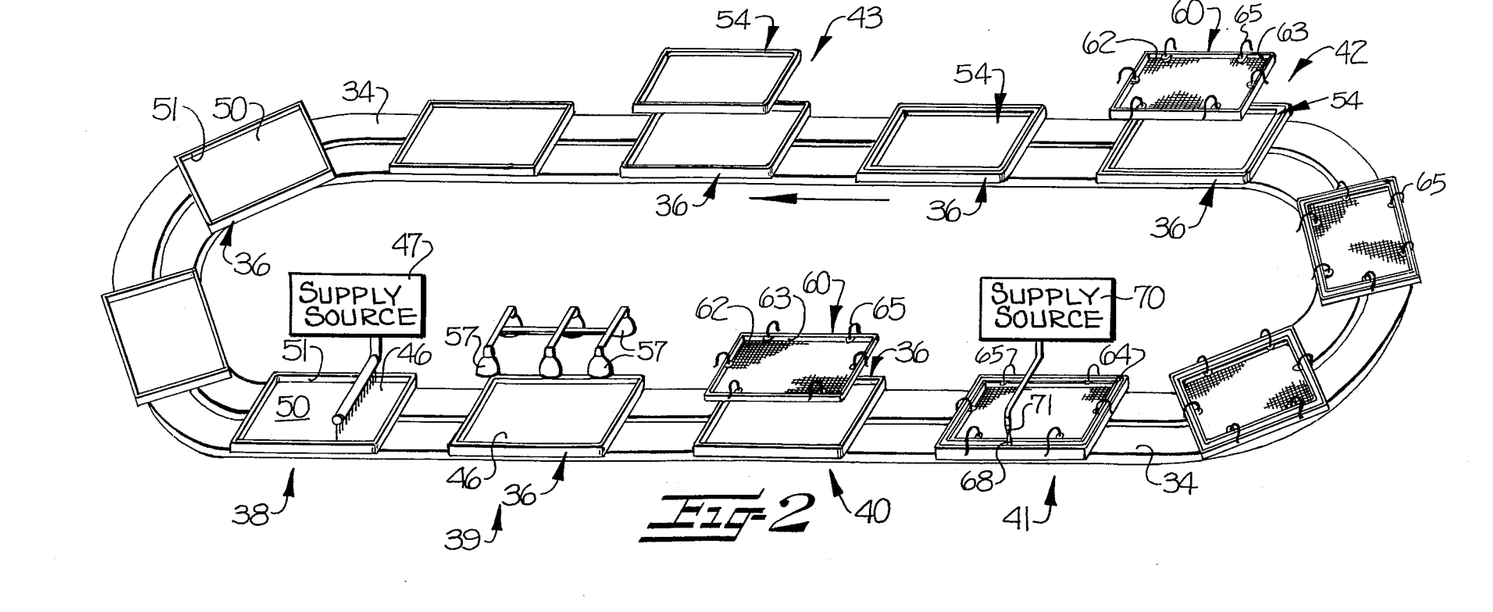
FIG. 2 is a schematic illustration of an apparatus embodying the present invention.
Figure 21:
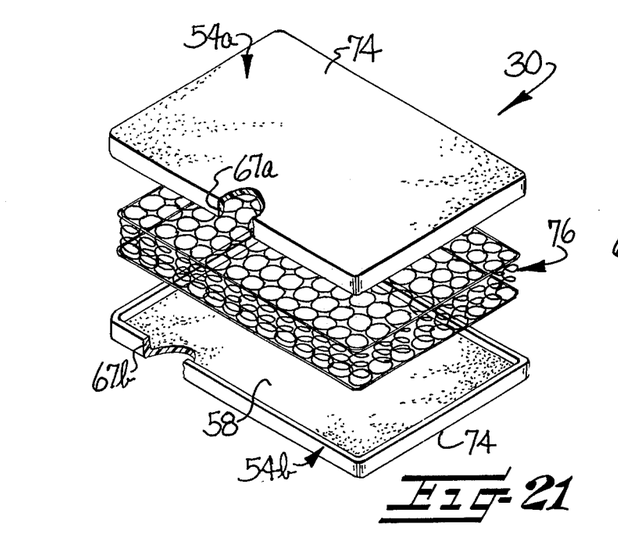
FIG. 21 is an exploded perspective view of an inner spring foam mattress which embodies a pair of foam pads fabricated in accordance with the present invention.
Figure 22:
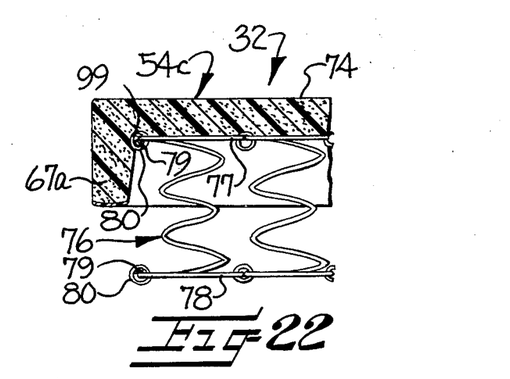
FIG. 22 is a fragmentary sectional view of a seat cushion having a foam pad fabricated in accordance with the present invention.

Referring more specifically to the drawings, FIGS. 1 and 2 schematically illustrate a process and apparatus for fabricating a foam pad adapted for use in an inner spring mattress 30 such as shown in FIG. 21, or in a seat cushion 32 such as shown in FIG. 22. According to the illustrated embodiment, the apparatus comprises an endless horizontal trackway 34 of conventional construction and which is adapted to convey a number of open top molds 36 in a serial arrangement thereabout. More particularly, the trackway 34 sequentially conveys each open top mold 36 past a mold filling station 38, a heating station 39, an insert assembly station 40, an edge forming station 41, an insert removal station 42, and a pad removal station 43.

Figures 3, 4, 5, 6:
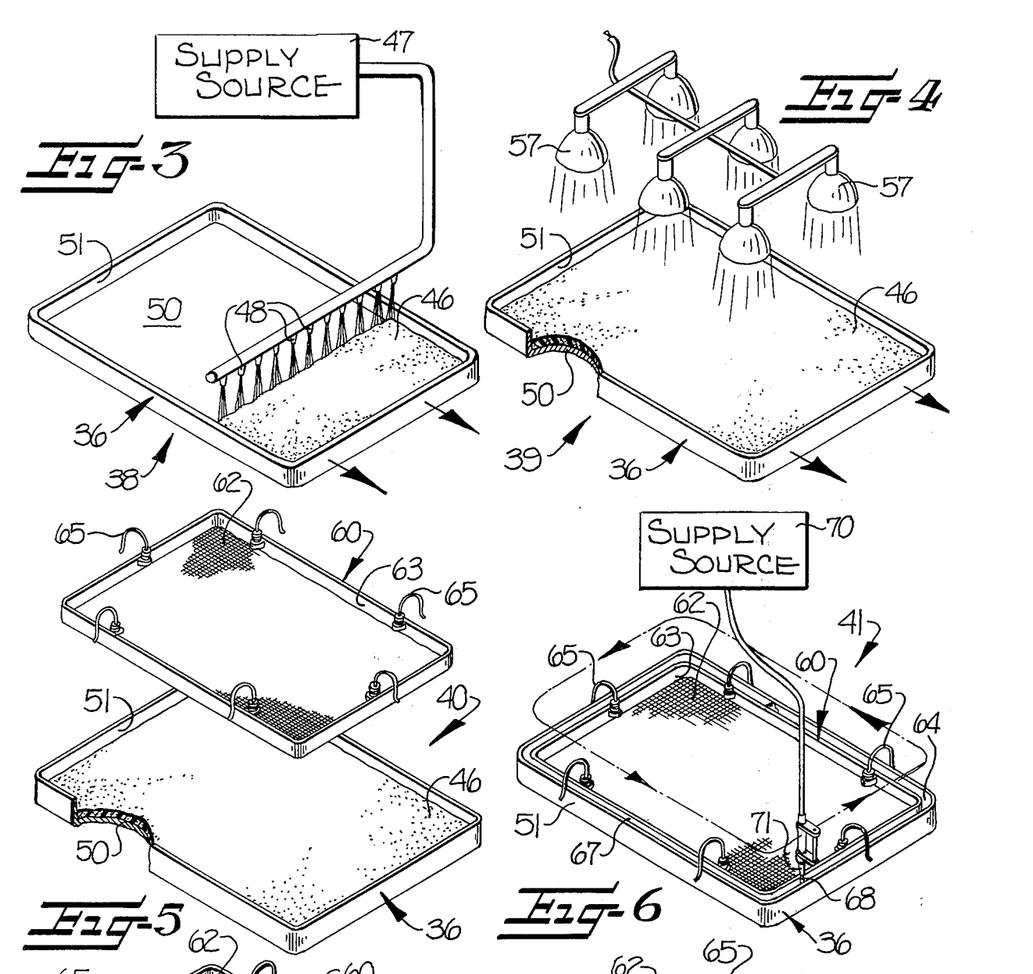
FIG. 3 is a schematic illustration of the mold filling station of the apparatus illustrated in FIG. 2.
FIG. 4 is a schematic illustration of the heating station shown in FIG. 2.
FIG. 5 is a schematic illustration of the insert assembly station shown in FIG. 2.
FIG. 6 is a schematic illustration of the edge forming station shown in FIG. 2 and wherein additional foamable material is deposited in the channel formed between the mold insert and mold.

Viewing first the mold filling station 38 as seen in FIGS. 2 and 3, a predetermined quantity of a foamable material 46 is fed from a suitable source of supply 47 and sprayed or otherwise deposited in the open top mold 36 through a number of nozzles 48 or the like. The mold 36 is typically constructed from a lightweight material such as aluminum, and comprises a generally flat bottom wall 50 and a raised peripheral edge wall 51 which defines a generally rectangular peripheral outline.

After the foamable material 46 is received in the mold, the evolution of carbon dioxide or other blowing agent causes the material to expand and rise within the mold to form a foamed cellular elastomeric pad 54 as hereinafter further described. In addition, it is a characteristic of the ingredients of the foamable material employed with the present invention that tough dense outer crust 55 (best seen in FIG. 16) is formed along the upper surface of the pad during the foaming process. The exact reasons for the formation of this crust are not fully understood, but it is believed that the formation is dependent upon contact with the atmosphere since a crust of this type is not formed along the bottom and side walls of the pad which are in contact with the mold surfaces. Typically, the crust has a thickness of about 1/16 inch, although in accordance with the present invention, the thickness may be substantially increased. More particularly, the thickness of the crust may be increased to a thickness substantially greater than 1/16 inch, such as about 1/8 inch, by heating the upper surface of the foaming material with infrared lamps 57 at the heating station 39.

As noted above, it is a characteristic of the described foamable material to form a rounded or crowned upper surface during the foaming operation. In accordance with the present invention, at least a major portion of the upper surface is leveled during the foaming operation to define a substantially level central portion 58 in the resulting pad 54, and this leveling operation is performed while maintaining a substantial portion of the central portion 58 in contact with the surrounding air to thereby result in the dense upper crust 55 being formed thereon. The above functions are achieved in the illustrated embodiment by the use of an openwork mold insert 60 which is positioned on the upper surface of the foaming material 46 so as to be floatingly carried thereon.

The insert 60 is typically fabricated from a suitable metallic material such as aluminum and comprises a generally flat openwork member 62 and an upstanding imperforate flange 63 surrounding the member. The flange 63 thereby defines a peripheral border extending above the plane of the member 62, and the border generally conforms to the rectangular peripheral outline of the mold 36 such that the mold insert is adapted to be positioned within the mold and spaced a substantially uniform distance from the peripheral edge wall 51 of the mold to thereby define a relatively narrow, open channel 64 therebetween.

The member 62 may be composed of a screen of uniform construction and formed in any suitable manner, such as by interlacing strands of material such as metal wire. Alternately, the screen could take the form of a conventionally formed expanded metal member. By design, the member 62 is composed primarily of open area, e.g., at least about 75%, to permit air to reach a substantial portion of the underlying upper surface and thereby permit the formation of a crust 55 thereon. As shown, the member 62 comprises a screen formed of woven wire fabric (note particularly FIG. 9), and typically the wires of the fabric have a diameter of about 1/16 inch and the openings are between about ⅜ and ½ inch square. Thus the wires of the screen overlie a relatively small part of the area of the central portion, and the development of the crust 55 is not significantly retarded by the presence of the mold insert.

Figure 9:
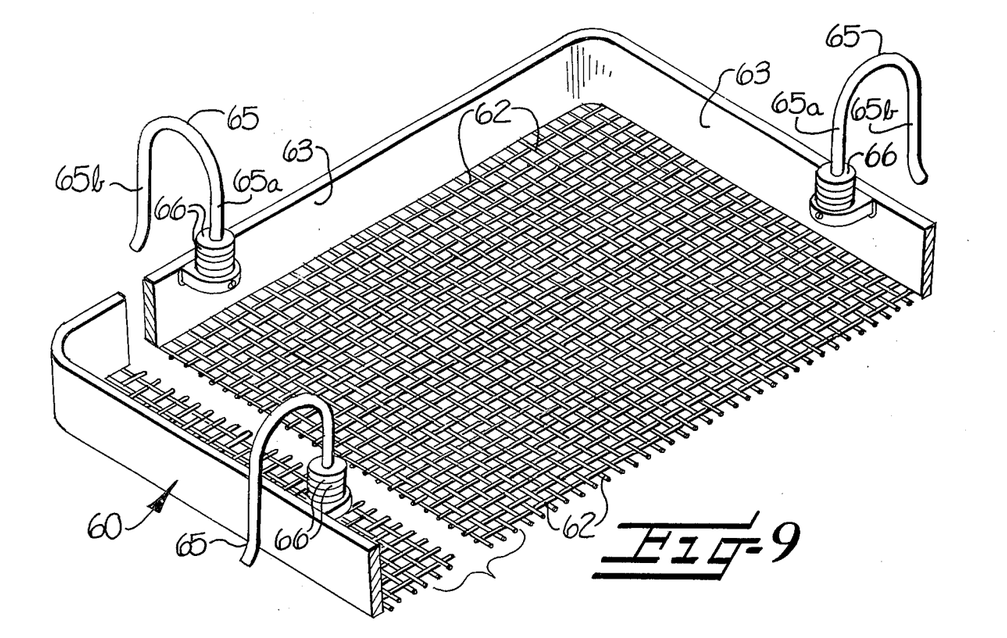
FIG. 9 is a sectioned perspective view of a mold insert in accordance with the present invention.
Figure 10:
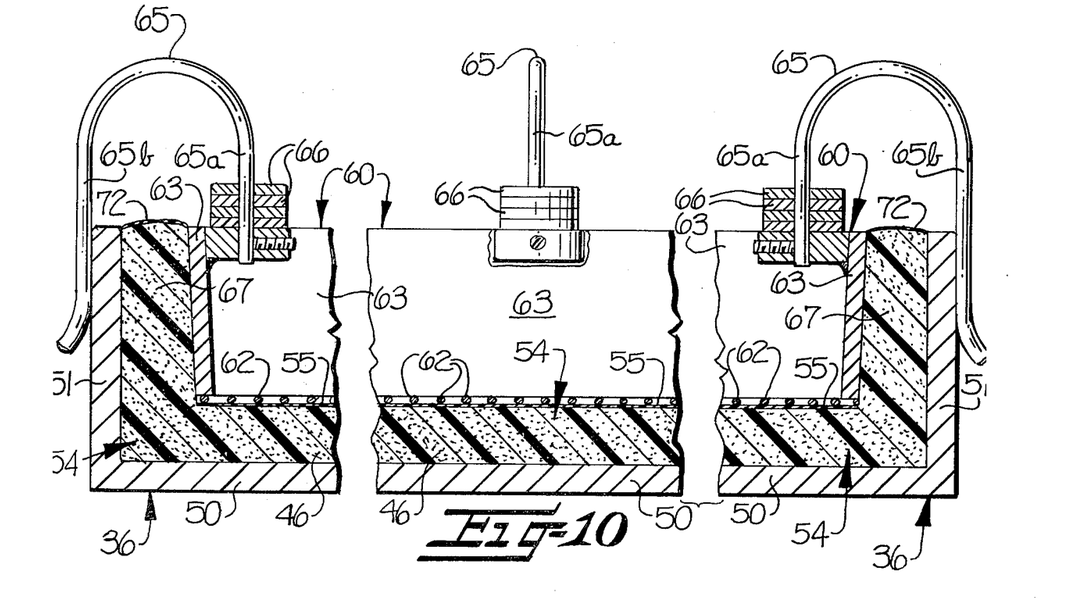
FIG. 10 is a sectioned front view of the mold insert positioned within the mold and illustrating the means for centering the insert within the mold.
Figure 11:
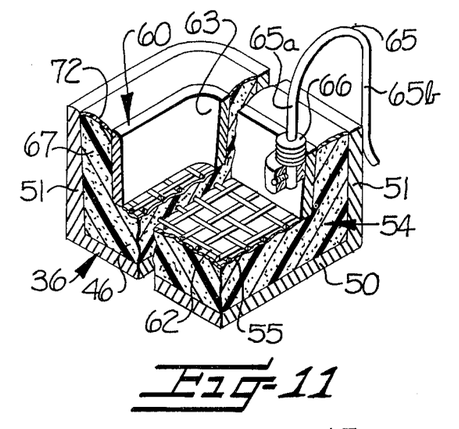
FIG. 11 is a sectioned perspective view illustrating the mold, mold insert, and resulting pad as seen in FIG. 6.

As seen for example in FIGS. 9 and 10, the mold insert includes a number of arcuately curved handles 65 carried along the flange 63. More particularly, the handles 65 are of a generally inverted U-shaped configuration, with the inner leg 65a being attached to the inwardly facing edge of the flange 63, and the outer leg 65b serving as a cam for engaging the outer surface of the wall 51 of the mold. By this arrangement, the insert may be conveniently lifted by the workmen, and guidingly centered within the peripheral outline of the mold such that the mold insert is free to ride upwardly with the foaming material while being maintained in its centralized location with respect to the mold. Further, a number of weights 66 in the form of cylindrical washers are adapted to be selectively positioned on the insert 60 by threading the same onto the handles in a manner apparent from FIGS. 9 and 10. Thus the weight of the insert may be varied to control the height and density of the resulting pad, and under certain conditions it is possible that the insert will remain substantially at its initial elevation and will prevent the rising of the foam.

It is a further aspect of the present invention to form a raised foam edge 67 along the periphery of the upper surface of the pad, the raised edge being designed to confiningly receive a spring assembly within the bounds thereof in a manner further described below. As illustrated in FIG. 6, additional foamable material 68 may be deposited in the open channel 64 between the edge wall 51 of the mold and the flange 63 of the mold insert to form the raised edge 67. By this arrangement, the additional foamable material 68 rises within the channel 64 and self-adheres to the upper surface of the underlying material 46 to form the raised edge 67.

The additional foamable material 68 may be deposited by an arrangement which includes a supply source 70, and a movable nozzle 71 operatively connected to the supply source. The nozzle 71 may be movable by hand, or a mechanism of suitable design (not shown) may be provided for automatically translating the nozzle 71 along the channel 64. Also, while it is generally preferred to add the additional foamable material immediately after positioning the mold insert on the underlying material 46, it should be understood that this step may be conducted after the foaming operation of the underlying material 46 is substantially completed since the additional material 68 readily self-adheres to the crust which would be formed on the underlying material. Also, as seen for example in FIGS. 10 and 16, a crust 72 is formed along the upper surface of the edge 67. While the additional foamable material 68 is typically of a composition similar to that of the initial material 46, the additional material may, if desired, be selected to produce a somewhat higher density foam and thus provide increased rigidity and resistance to penetration by the spring assembly.

When the foaming process for both the underlying material 46 and additional material 68 is substantially completed, the mold insert 60 is removed from the resulting pad 54 at station 42. The pad 54 is then stripped from the mold at station 43. In this regard, it will be understood that the mold insert 60 may be coated with a conventional release agent, such as wax, Teflon or silicone to prevent adherence to the crust 55.

Figure 16:
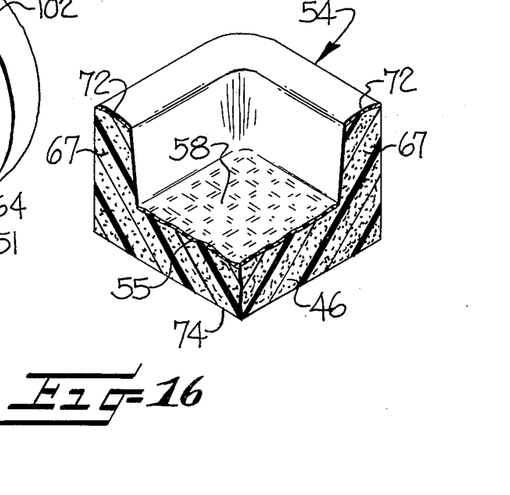
FIG. 16 is a sectioned perspective view of a foam pad resulting from the practice of the present invention.

As best seen in FIGS. 16 and 21, the resulting pad 54 comprises a generally flat bottom or outer surface 74, and an inner surface comprising the generally flat central portion 58 and the raised edge 67. The central portion 58 will be seen to have a gridwork of indentations therein resulting from the wires of the screen 62 of the mold insert. The pad 54 is thus in a form which may be conveniently shipped or stored prior to being interconnected with a spring assembly, or alternatively, the pad may be immediately joined to the spring assembly.

Where the pad 54 is to be employed in the fabrication of an inner spring mattress 30 as seen in FIG. 21, a spring assembly 76 is disposed intermediate two substantially identical pads 54a, 54b, the pad 54a being inverted so that they are disposed in an adjacent, parallel relationship with the inner surfaces facing each other. The spring assembly 76 itself is generally conventional, and includes generally flat upper and lower terminal face portions 77, 78, respectively, with each face portion contacting the central portion of the associated pad such that the outer crust serves as an insulator to prevent the terminal face portions from penetrating into the interior of the pads during use. Also, each face of the spring assembly includes a relatively heavy peripheral border wire 79 having a smaller helical wire 80 disposed thereabout. The spring assembly has an overall configuration generally conforming to that of the central portion of each pad such that it is confiningly received within the bounds of the depending edges 67a, 67b of the pads whereby the depending edges serve to prevent lateral shifting between the spring assembly and pads. To maintain the spring assembly in assembled relation with the pads, there may be further provided a fabric covering (not shown) in the form of a mattress ticking which completely surrounds the assembled spring assembly and pads.

The pad 54 of the present invention is also adapted for use in the fabrication of a seat cushion 32 as shown in FIG. 22. In this case, a single pad 54c is joined to one side of a spring assembly 76 such that the terminal face portions 77 of the spring assembly contact the outer crust of the pad 54c in the manner described above. Here again, the spring assembly 76 has an overall configuration so as to be confiningly received within the bounds of the depending foam edge 67c so as to prevent lateral shifting between the spring assembly and pad.

Figures 7, 8:
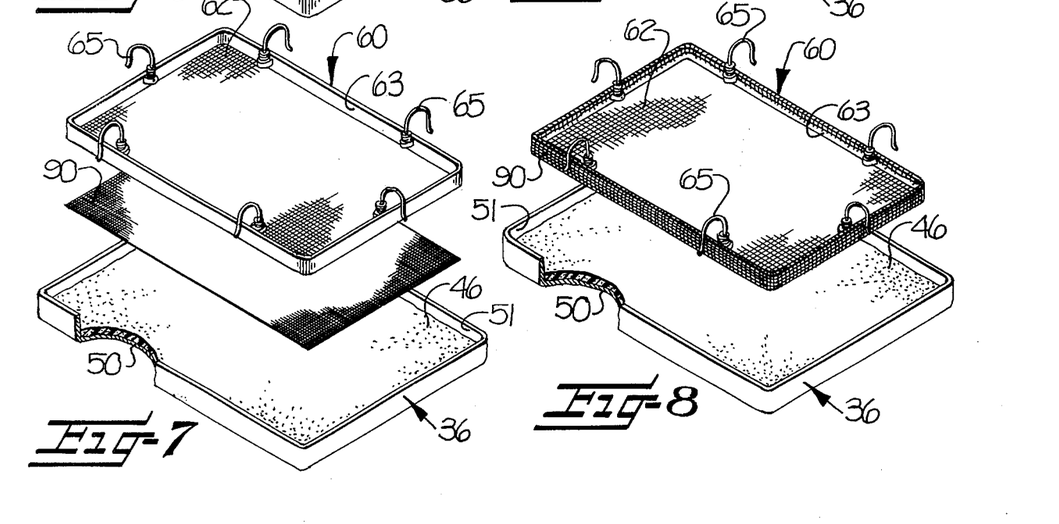
FIG. 7 is a view similar to FIG. 5, but illustrating an alternate embodiment wherein the mold insert and an open mesh scrim fabric are positioned on the foaming material.
FIG. 8 is a view similar to FIG. 7, but illustrating another embodiment wherein an open mesh scrim fabric is presecured to the mold insert prior to being positioned on the foaming material.

In the embodiment of the invention illustrated in FIG. 7, an open mesh fabric 90 or scrim is initially positioned on the foaming material 46 so as to be floatingly carried thereon and underlie the mold insert 60. By this arrangement, the mesh fabric 90 becomes essentially embedded in the upper crust to thereby reinforce the same. The fabric 90 is generally conventional, and may for example comprise four by four cotton mesh fabric (defined as having four openings per inch in each of the two transverse directions), or five by five cotton mesh fabric.

Figure 13:
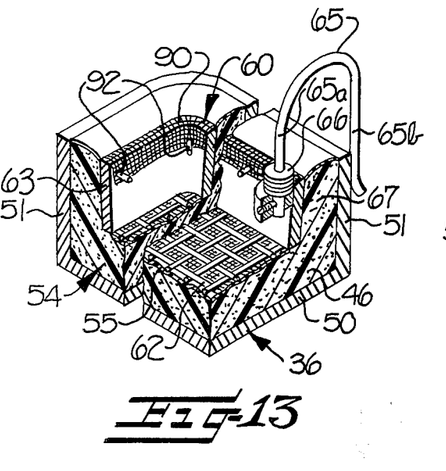
FIG. 13 is a sectioned perspective view illustrating the embodiment shown in FIG. 8 and wherein the open mesh scrim fabric is presecured to the mold insert.
Figure 18:
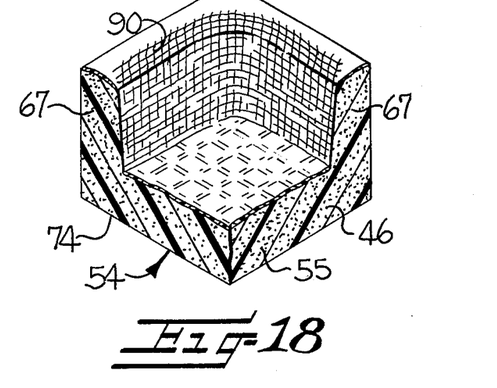
FIG. 18 is a sectioned perspective view similar to FIG. 16, but illustrating a foam pad resulting from the use of a mold insert as shown in FIG. 8 and wherein a reinforcing open mesh scrim fabric is embedded in the crust of the flat central portion of the pad and the inwardly facing surface of the raised foam edge.

In order to facilitate the placement of the mesh fabric 90 on the foaming material 46, the fabric may be presecured to the lower surface of the mold insert 60 such that the fabric and insert are positioned on the foaming material substantially concurrently, note FIGS. 8 and 13. In this embodiment, a plurality of spaced pins 92 are positioned along the inwardly facing surface of the flange 63 of the insert so that the fabric 90 may be drawn over the top of the flange and secured to the pins in the manner best seen in FIG. 13. When the foaming of the material is completed, the fabric is released from the pins 92, and the insert removed. This results in the pad as shown in FIG. 18 wherein the mesh fabric is embedded in the crust 55 along the central portion, and along the inwardly facing surface of the raised edge 67. In this arrangement, the fabric 90 not only reinforces the crust, but also serves to prevent the spring assembly from cutting laterally into the raised edge of the pad.

Figure 12:
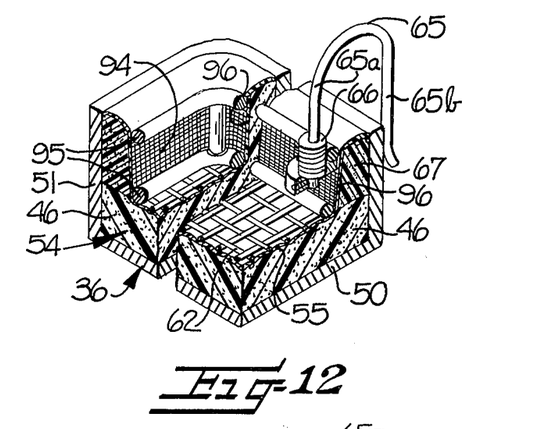
FIG. 12 is a sectioned perspective view illustrating another embodiment wherein the upstanding flange of the mold insert comprises a relatively fine, openwork screen.
Figure 17:
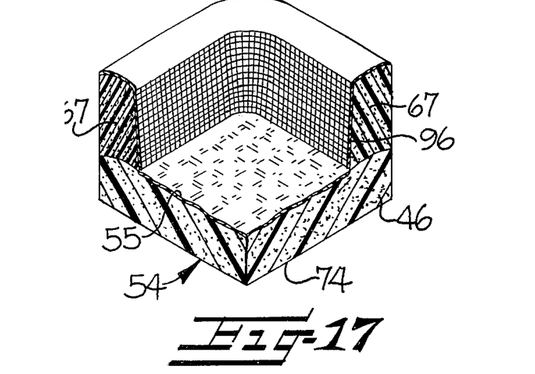
FIG. 17 is a sectioned perspective view similar to FIG. 16, but illustrating a foam pad resulting from the use of a mold insert as shown in FIG. 12 and wherein a crust is formed on the inwardly facing surface of the raised foam edge.

Another embodiment of the present invention is illustrated in FIGS. 12 and 17 wherein the flange of the mold insert comprises a relatively fine, openwork screen 94 supported by a framework of interconnected rods 95. The screen 94 is adapted to permit air to pass therethrough and contact the inside surface of the foamable material deposited in the open channel, to thereby permit the formation of a dense crust 96 on the inwardly facing surface of the resulting raised edge. In this regard, the fineness of the screen 94 should be correlated to the viscosity of the foamable material deposited in the open channel such that the foamable material will not penetrate the screen. For typical foamable materials, the screen should be of a fineness comparable to ordinary household window screening. FIGS. 12 and 17 further illustrate the above described condition wherein the foamable material 68 added to form the raised edge produces a higher density foam than the initial foamable material 46.

Figure 14:
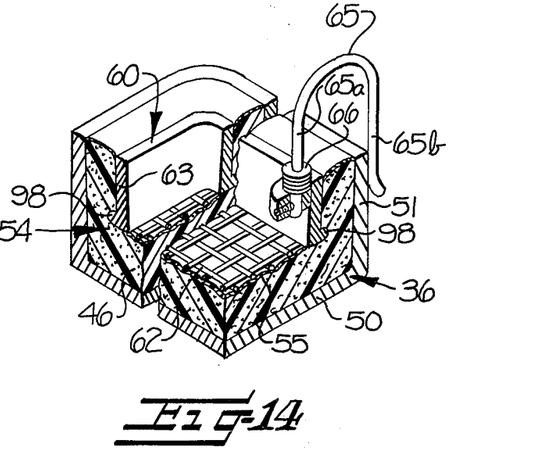
FIG. 14 is a sectioned perspective view illustrating another embodiment wherein the upstanding flange of the mold insert includes a laterally directed peripheral rib for forming a channel along the inwardly facing surface of the raised edge.
Figure 19:
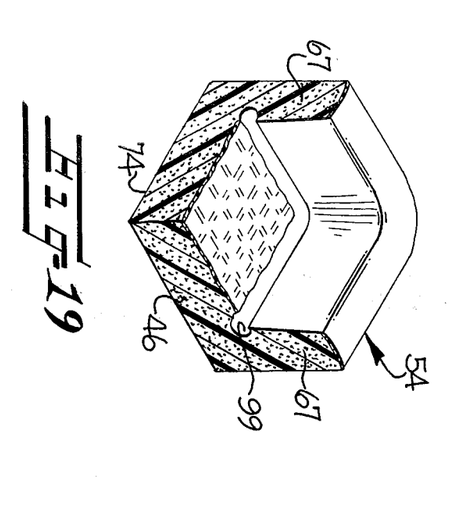
FIG. 19 is also a view similar to FIG. 16 but illustrating a foam pad resulting from the use of a mold insert as shown in FIG. 14.

As seen in the embodiment illustrated in FIG. 14, the mold insert includes a laterally directed peripheral rib 98 which extends along the lower edge of the flange 63 and into the channel 64. The rib thus lies substantially coplanar with the screen 62, and is adapted to form a peripheral channel 99 along the inwardly facing surface of the raised foam edge as seen in FIG. 19. The channel 99 is adapted to receive the wires 79 and 80 of the spring assembly 76, and thereby acts to retain the wires therein and thereby interconnect the pad and spring assembly. This arrangement is also shown in the seat cushion illustrated in FIG. 22.

Figure 15:
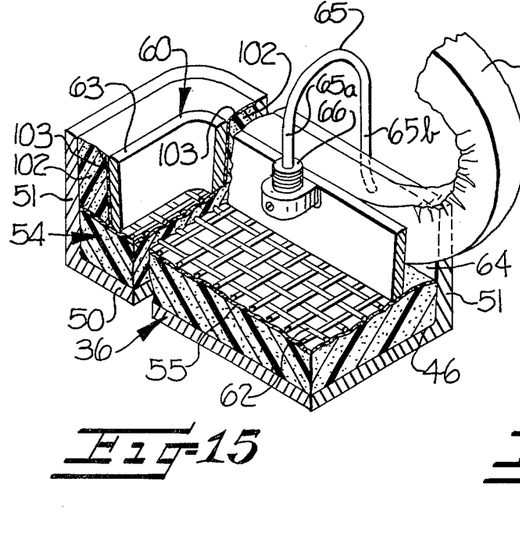
FIG. 15 is a schematic illustration of an alternate method for forming a raised edge along the periphery of the foam pad by positioning a strip of foamed material in the channel formed between the mold and mold insert.
Figure 20:
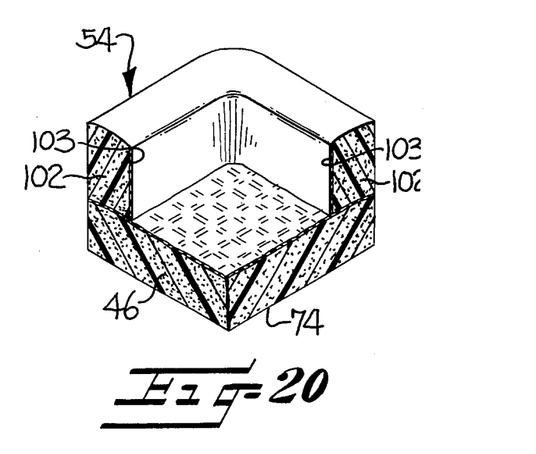
FIG. 20 is a sectioned perspective view of a foam pad resulting from the method illustrated in FIG. 15.

An alternate arrangement for forming the raised edge 67 along the periphery of the upper surface of the pad is illustrated in FIG. 15. In this embodiment, a cut strip 102 of foamed material is applied along the periphery of the material 46, with the channel 64 serving to guide the positioning of the strip thereon. The strip may be so positioned while the foaming operation is proceeding, in which case the tacky nature of the foaming material will self-adhere the strip thereto. Alternately, the strip may be joined thereto by means of a suitable adhesive after the foaming operation is completed. As seen in FIG. 20, the strip 102 may include a dense outer crust 103 along the inside surface thereof to serve as an insulator against the lateral movement of the spring assembly.

Foam pads produced in accordance with the present invention typically measure about 1½ to 2 inches in thickness at the center portion 58, and the edges 67 are about 2 to 3 inches in height and about 1½ to 2 inches in width. Also, the flanges 63 of the insert may be slightly tapered as shown in the drawings to facilitate removal thereof from the pad, thus resulting in a slightly tapered inwardly facing surface on the edge.

As noted above, the weight of the insert 60 may be varied by means of the removable weights 66 to control the height and density of the underlying foam. In this regard, it will be understood that the weight of the insert serves to retard expansion and densify the foam therebeneath, while permitting the free expansion of the foam along the border within the channel 64. This free expansion may under certain conditions result in the formation of a raised edge of significant height, thereby eliminating or at least reducing the required amount of the additional foamable material 68.

The specific ingredients of the foaming material employed with the present invention are generally conventional, and may comprise a variety of well-known resin foaming compositions which are adapted to expand and cure in situ as it is poured into the mold and which is self-curing at room temperature and thus does not require any after treatment such as heating. A foam which meets the above requirements and which also produces a dense outer crust as described above is chemically blown urethane foam.

A specific non-limiting example of a suitable urethane foaming material is set forth below:

| Formulation | Parts By Weight |
|---|---|
| NIAX Polyol 11-34 (Union Carbide Corp.) | 60 |
| NIAX Polyol 34-28 (Union Carbide Corp.) | 40 |
| Water | 2.8 |
| NIAX Catalyst A-1 (Union Carbide Corp.) | 0.08 |
| NIAX Catalyst NEM (Union Carbide Corp.) | 0.8 |
| Solid DABCO (Houndry Process and Chemical Co.) | 0.08 |
| Silicone L-5305 (Union Carbide Corp.) | 1.5 |
| Dibutyltindilaurate | 0.03 |
| NIAX Isocyanates TDI/AFPI (Union Carbide Corp.) | 34.2 |
| Ratio | 80/20 |
| Index | 100 |

Niax Polyol 11–34 is a 5000 molecular weight polyether triol capped with ethylene oxide to give a very high primary hydroxyl content. Niax Polyol 34–28 is a polymer polyol, made by insitu polymerization of a vinyl containing monomer in a conventional polyol. Niax Catalyst A-1 is a 70% solution of bis (2 - dimethylaminoethyl) ether in dipropylene glycol. Niax Catalyst NEM is N-ethyl morpholine. Solid DABCO is a powdered cyclic triethylene diamine. Niax Isocyanate TDI is toluene di-isocyanate. Niax Isocyanate AFPI is methylene bis-phenyl isocyanate. The resulting foam is relatively hard, and has a core density of about 2.48 pounds per cubic foot.

Foam pads produces in accordance with the above formulation can normally be demolded approximately 5 to 8 minutes after the mold filling operation. The following is a specific non-limiting example of a typical timing sequence for the various operations of the present invention:

a. The initial foamable material 46 is deposited in the mold 36.

b. Heat from the infrared lamps 57 is applied to the surface of the foaming material approximately 1½ minutes after the material has been deposited in the mold, and the heat is applied for approximately 1 minute to develop a thick crust.

c. After the heating operation is terminated, the insert 60 is applied and maintained on the rising foam material for approximately 2½ minutes.

d. The additional foamable material 68 is deposited in the channel 64 during the foaming of the initial material such that the foaming of the initial material and the additional material 68 occurs substantially concurrently.

e. Upon completion of foaming, the insert 60 is removed, and after a short additional cooling period, the pad 54 may be stripped from the mold.

Further details relating to the method and resulting product of the present invention may be obtained from applicant's copending application entitled "Spring Cushion Construction and Method of Forming Same", Ser. No. 478,618, filed concurrently herewith.

In the drawings and specification, there has been set forth a preferred embodiment of the invention, and although specific terms are employed, they are used in a generic and descriptive sense only and not for purposes of limitation.

That which is claimed is:

1. An apparatus for fabricating a foam pad suitable for use in a seat, mattress, or the like and comprising
    an open top mold comprising a generally flat bottom wall and a raised peripheral edge wall surrounding said bottom wall and defining a predetermined peripheral outline, said mold being adapted to receive a foamable elastomeric material therein to form a resilient cellular pad having a dense crust on the upper surface thereof which is in contact with the surrounding air, and
    a mold insert adapted to be positioned on the upper surface of the foaming material in said open top mold for leveling the underlying foaming material and while permitting air to contact a substantial portion of the surface of the foaming material to permit the formation of a dense crust, said insert comprising a generally flat openwork member defining a peripheral border having somewhat smaller dimensions than said peripheral outline of said open top mold such that the mold insert may be floatingly positioned on the foaming material within said mold without supportingly resting upon said peripheral edge wall of said mold.

2. The apparatus as defined in claim 1 wherein said openwork member of said mold insert comprises a screen.

3. The apparatus as defined in claim 2 wherein said screen comprises interlaced strands having a diameter of about 1/16 inch and defining openings which are between about ⅜ to ½ inch square.

4. The apparatus as defined in claim 1 wherein said openwork member of said mold insert comprises at least about 75% open area.

5. The apparatus as defined in claim 1 wherein said mold insert further comprises an upstanding flange surrounding said openwork member along said peripheral border, and wherein said flange is adapted to be spaced a substantially uniform distance from said peripheral edge wall of said mold when said mold insert is positioned within said mold to thereby define a relatively narrow, open channel therebetween.

6. The apparatus as defined in claim 5 further comprising means for depositing foamable material in said open channel such that the thus deposited foamable material is adapted to self-adhere to the upper surface of the underlying elastomeric material and form a raised foam edge along the periphery of the upper surface.

7. The apparatus as defined in claim 6 wherein said upstanding flange of said mold insert comprises an imperforate wall.

8. The apparatus as defined in claim 6 wherein said upstanding flange of said mold insert includes a plurality of spaced pins adapted to releasably carry an open mesh fabric along the lower surface of the mold insert such that the open mesh fabric and mold insert may be positioned on the foaming material substantially concurrently and with the open mesh fabric becoming essentially embedded in the upper crust of the elastomeric material.

9. The apparatus as defined in claim 6 wherein said upstanding flange comprises a fine, openwork screen adapted to permit air to pass therethrough and contact the inside surface of the foamable material deposited in the open channel to form a dense crust on the inwardly facing surface of the resulting raised foam edge.

10. The apparatus as defined in claim 6 wherein said upstanding flange of said mold insert includes a laterally directed peripheral rib extending into said channel and lying substantially coplanar with said openwork member, said rib being adapted to form a peripheral channel along the inwardly facing surface of said raised foam edge.

11. The apparatus as defined in claim 5 further comprising means for guidingly maintaining said mold insert substantially centered within the peripheral outline of said mold such that said mold insert is free to rise upwardly with the foaming material while being maintained in its centralized location with respect to the mold.

12. The apparatus as defined in claim 11 further including weight means adapted to be selectively carried by said mold insert for controlling the height and density of the underlying foaming material.

13. An apparatus for fabricating a foam pad suitable for use in a seat, mattress, or the like and comprising
    an open top mold comprising a generally flat bottom wall and a raised peripheral edge wall surrounding said bottom wall and defining a predetermined peripheral outline, said mold being adapted to receive a foamable elastomeric material therein to form a resilient cellular pad having a dense crust on the upper surface thereof which is in contact with the surrounding air,
    means for depositing foamable elastomeric material in said open top mold, means for applying heat to the upper surface of the foamable material while in said open top mold to result in the formation of a crust of substantial thickness thereon,
    a mold insert adapted to be positioned on the upper surface of the foaming material in said open top mold for leveling the underlying foaming material and while permitting air to contact a substantial portion of the surface of the foaming material to permit the formation of a dense crust, said mold insert comprising a generally flat openwork member and an upstanding flange surrounding said member, said flange defining a peripheral border having somewhat smaller dimensions than said peripheral outline of said top mold such that said mold insert is adapted to be positioned within said mold without supportingly resting upon said peripheral edge wall of said mold and spaced a substantially uniform distance from said peripheral edge wall to thereby define a relatively narrow open channel therebetween, and means for depositing foamable material in said open channel such that the thus deposited foamable material is adapted to self-adhere to the upper surface of the underlying elastomeric material and form a raised foam edge along the periphery of the upper surface.

14. The apparatus as defined in claim 13 wherein said means for depositing foamable material in the open channel comprises a supply source, and a movable nozzle operatively connected to said supply source.

15. The apparatus as defined in claim 14 wherein said means for depositing foamable material in the open channel further comprises means for translating said nozzle along the open channel such that a predetermined amount of the foamable material is deposited in the channel.

16. An apparatus for fabricating a foam pad suitable for use in a seat, mattress, or the like and comprising an open top mold comprising a generally flat bottom wall and a raised peripheral edge wall surrounding said bottom wall and defining a predetermined peripheral outline, said mold being adapted to receive a foamable elastomeric material therein to form a resilient cellular pad having a dense crust on the upper surface thereof which is in contact with the surrounding air, means for depositing foamable elastomeric material in said open top mold, means for applying heat to the upper surface of the foamable material while in said open top mold to result in the formation of a crust of substantial thickness thereon, and a mold insert adapted to be positioned on the upper surface of the foaming material in said open top mold for leveling the underlying foaming material, said insert including a generally planar lower surface and defining a peripheral border having somewhat smaller dimensions than said peripheral outline of said open top mold such that said mold insert is adapted to be floatingly positioned on the foaming material within said mold without supportingly resting along said peripheral edge wall of said mold.

17. The apparatus as defined in claim 16 wherein said means for applying heat to the upper surface of the foamable material comprises infrared lamps.

18. An apparatus for fabricating a foam pad suitable for use in a seat, mattress, or the like and comprising a plurality of open top molds each comprising a generally flat bottom wall and a raised peripheral edge wall surrounding said bottom wall and defining a predetermined peripheral outline, each of said molds being adapted to receive a foamable elastomeric material therein to form a resilient cellular pad having a dense crust on the upper surface thereof which is in contact with the surrounding air, means for conveying said open top mold in a serial arrangement about an endless path of travel, means positioned along said path of travel for depositing foamable elastomeric material in each of said open top molds, means positioned along said path of travel and downstream of said depositing means for applying heat to the upper surface of the foamable material while in the associated open top mold to result in the formation of a crust of substantial thickness thereon, a plurality of mold inserts each adapted to be positioned on the upper surface of the foaming material in an associated open top mold for leveling the underlying foaming material and while permitting air to contact a substantial portion of the surface of the foaming material to permit the formation of a dense crust, each of said mold inserts comprising a generally flat openwork member and an upstanding flange surrounding said member, said flange defining a peripheral border having somewhat smaller dimensions than said peripheral outline of its associated open top mold such that said mold insert is adapted to be positioned within said mold without supportingly resting upon said peripheral edge wall of said mold and spaced a substantially uniform distance from said peripheral edge wall to thereby define a relatively narrow open channel therebetween, and means positioned along said path of travel and downstream of said heat applying means for depositing foamable material in said open channel of each assembled mold and mold insert such that the thus deposited foamable material is adapted to self-adhere to the upper surface of the underlying elastomeric material and form a raised foam edge along the periphery of the upper surface.

19. The apparatus as defined in claim 18 wherein said flat openwork member of each of said mold inserts comprises a substantially uniform screen comprising at least about 75% open area.

20. The apparatus as defined in claim 18 wherein each of said mold inserts further comprises cam means adapted to operatively engage said raised edge wall of its associated mold for guidingly maintaining said mold insert substantially centered within the peripheral outline of said mold such that the mold insert is free to rise upwardly with the foaming material while being maintained in its centralized location with respect to the mold.

21. The apparatus as defined in claim 18 wherein said means for conveying said open top molds comprises an endless horizontal trackway.

22. The apparatus as defined in claim 21 wherein said means for applying heat to the upper surface of the foamable material comprises a plurality of infrared lamps mounted above said trackway.

* * * * *

UNITED STATES PATENT AND TRADEMARK OFFICE
CERTIFICATE OF CORRECTION

PATENT NO. : 3,942,926
DATED : March 9, 1976
INVENTOR(S) : Carl Gordon Bullock, Jr.

It is certified that error appears in the above-identified patent and that said Letters Patent are hereby corrected as shown below:

Column 5, Line 7, delete "and" and insert --to--
Column 11, Line 3, CLAIM 13, after "said" insert --open--

Signed and Sealed this twenty-ninth Day of June 1976

[SEAL]

Attest:

RUTH C. MASON
*Attesting Officer*

C. MARSHALL DANN
*Commissioner of Patents and Trademarks*